United States Patent [19]
Pajitnov

[11] Patent Number: 5,944,605
[45] Date of Patent: Aug. 31, 1999

[54] SYSTEM AND METHOD FOR COMPOSING AN IMAGE WITH FRAGMENTS WHICH CONFORM TO THE SIZE AND SHAPE OF A GRID

[75] Inventor: Alexey L. Pajitnov, Kirkland, Wash.

[73] Assignee: Microsoft Corporation, Redmond, Wash.

[21] Appl. No.: 08/840,499

[22] Filed: Apr. 21, 1997

[51] Int. Cl.[6] .................................................. A63F 9/06
[52] U.S. Cl. .................................. 463/9; 463/1; 463/31; 273/153 R; 273/156; 273/157 R
[58] Field of Search .............................. 463/1, 9, 10, 11, 463/31, 33, 35; 273/153 R, 153 S, 157 R, 156, 432, 445, 446; 395/159, 152; 345/173

[56] References Cited

U.S. PATENT DOCUMENTS

| | | |
|---|---|---|
| 5,296,845 | 3/1994 | Haller .................................. 273/157 R |
| 5,483,261 | 1/1996 | Yasutake ................................. 345/173 |
| 5,558,339 | 9/1996 | Perlman .................................... 463/42 |
| 5,577,185 | 11/1996 | Tunnell et al. ............................ 463/9 |
| 5,605,332 | 2/1997 | Harnett ............................... 273/157 R |
| 5,619,830 | 4/1997 | Osborn ............................... 273/157 R |
| 5,643,084 | 7/1997 | Mirsky ....................................... 463/9 |
| 5,722,657 | 3/1998 | Cabrera ............................... 273/153 S |
| 5,768,382 | 6/1998 | Schneier et al. .......................... 463/41 |
| 5,779,549 | 7/1998 | Walker et al. ............................. 463/42 |

*Primary Examiner*—Jessica J. Harrison
*Assistant Examiner*—Sheila D. Clayton
*Attorney, Agent, or Firm*—Jones & Askew, LLP

[57] ABSTRACT

Composing an image from fragments of the image. The fragments of the image and a playing grid (used to define the fragments) are downloaded from a server. The positions of the fragments are shuffled within the grid. The appearance of each fragment is altered to conform to characteristics of the fragment's position or cell within the grid. After displaying an initial configuration of the fragments, one or more fragments are selected and moved to new positions or cells within the grid. In one embodiment, a single fragment is selected and moved to a new cell. In another embodiment, a fragment in one cell is selected. A new cell having another fragment is also selected. The two fragments are swapped between their respective positions or cells. After moving or swapping any fragments, the appearance of a moved or swapped fragment is altered to conform to characteristics (such as the size, shape, and aspect ratio) of the fragment's new position or cell within the grid. This new configuration of the fragments is displayed. If the new configuration correctly represents the original image and a connection to the server is still operational, a timestamp is uploaded to the server. In response to the uploaded timestamp, a score is generated and downloaded reflecting the player's score when composing the image from the fragments.

20 Claims, 10 Drawing Sheets

SYSTEM AND METHOD FOR COMPOSING AN IMAGE WITH FRAGMENTS WHICH CONFORM TO THE SIZE AND SHAPE OF A GRID

TECHNICAL FIELD

This invention generally relates to graphical puzzles and, more particularly described, relates to composing an image having image fragments which conform to the size and shape of a puzzle grid.

BACKGROUND OF THE INVENTION

"Compose the picture" puzzles, such as jigsaw puzzles, are popular types of puzzles. Traditionally, these type of puzzles involve dividing an image into a grid pattern of several similarly-sized fragments or pieces. The pieces are then randomly mixed up. In this mixed up state, the image is not easily recognized. Once the player recognizes the image, the puzzle becomes easier to solve. A player solves the puzzle by repositioning the pieces to reconstruct the image.

This type of "compose the picture" puzzle can be implemented in a paper or board format and on the computer. In one computerized implementation of a "compose the picture" puzzle, the player repeatedly swaps the position of two pieces on the grid until the image is accurately represented to the player. When the two pieces are swapped, the computer is able to display a new configuration of the pieces to the player.

In another computerized implementation of the "compose the picture" puzzle, a single piece is be left out of the grid so that a piece may be shifted to an empty position within the grid. The player repeatedly shifts different pieces of the puzzle until the image is accurately represented to the player.

With these kind of computerized "compose the picture" puzzles, there is a need to shorten the time to recognize the overall image and solve the puzzle. Players may become disenchanted with a challenging computerized puzzle if it takes too long to solve the puzzle. Players may not have a long period of time to spend playing the puzzle in order to reach a solution. Shortening the time it takes for a player to recognize the overall image is especially needed in the realm of on-line gaming. In on-line gaming, games may be played over data networks, such as the Internet or the World Wide Web. One way of shortening the playing time needed to solve the puzzle is to reduce the number of pieces in the puzzle. By shortening the time needed to solve a challenging puzzle, time-based on-line charges and the use of computer resources may be minimized.

However, the need to shorten the playing period for a puzzle must be balanced with the need to maintain an adequate level of pleasure and challenge when playing the puzzle. Shortening the playing time can make the puzzle too simple for many players. In other words, players may lose interest in a game that takes an extremely short amount of time to play.

Therefore, there is a need for a system for composing an image within a computerized "compose the picture" puzzle (1) which can be played in a relatively short period of time while still providing an intriguing challenge to the player, (2) which is visually stimulating for the player, (3) which allows the player to recognize the image from distorted fragments of the puzzle, and (4) which uses a grid of cells or positions for the fragments which is non-uniform.

SUMMARY OF THE PRESENT INVENTION

The present invention satisfies the above-described needs by providing a system and method for composing an image, which has been divided into fragments according to a playing grid. Essentially, the image and the grid make up the basis for a computerized puzzle. The grid has various non-uniformly sized positions or cells. Together, the cells define the grid. In playing a computerized puzzle where a player has to compose or reconstruct the image from the fragments, the fragments are essentially selected and moved. The appearance of these selected and moved fragments are then visually distorted or altered in order to reconstruct or compose the image from the fragments.

In general, the present invention provides a method where an initial configuration of the fragments is displayed within the grid. The initial configuration of fragments may be created by shuffling the fragments between positions within the grid. After shuffling the positions, the appearance of each fragment may be altered to conform to the characteristics of its respective position within the grid. In this manner, the fragments are placed in their initial configuration.

After the initial configuration is displayed, one of the fragments is selected. This selected fragment is located at one of the positions within the grid. The selected fragment is moved to a second position within the grid. The second position has defined characteristics, such as a defined size, shape, and aspect ratio. Once the selected fragment is moved, the appearance of the selected fragment is altered to conform to the defined characteristics of the second position. Typically, the appearance of the selected fragment is altered by horizontally and vertically stretching and shrinking the size and the aspect ratio of the selected fragment. In this way, the image is composed or reconstructed from the fragments of the image by selecting, moving and altering the appearance of the fragment within the grid.

Altering the appearance of a fragment to conform to its grid position is advantageous because it allows the use of non-uniformly sized and non-uniformly shaped positions within the grid. Furthermore, altering the appearance of the fragments is visually challenging for a player attempting to compose the image from the fragments. Additionally, using such a grid and altering the appearance of the fragments as they are moved within the grid provides an adequate challenge to the player while allowing the image to be composed within a relatively short period of time.

After the selected fragment is altered, the fragments are in a new configuration of appearances and positions. This new configuration of fragments may be displayed within the grid.

Additionally, a determination may be made regarding whether the new configuration of fragments correctly represents the image. If the new configuration of the fragments does not correctly represent the image, then another fragment may be selected and the above-described steps may be repeated.

In another aspect of the present invention, the initial configuration of fragments is displayed within cells of the grid. Prior to displaying the initial configuration, a control module, the fragments, and the grid may be downloaded from the server. Once downloaded, each of the fragments may be individually assigned to each of the grid cells. After assigning the cells to the fragments, the appearance of each fragment may be altered to conform to the characteristics of its respectively assigned cell within the grid. In this manner, the appearances and cell assignments of the fragments form the initial configuration of the fragments. The initial configuration of fragments may advantageously allow a player to interpret the altered and distorted fragments and possibly recognize the image.

After displaying the initial configuration of fragments, a first fragment is selected. The first fragment is located within a first cell of the grid. Next, a new cell within the grid is selected as a desired location for the first fragment. Prior to selection, the new cell contains a second fragment. The first fragment is moved to the new cell and, in a swapping manner, the second fragment is moved to the first cell. The appearance of the first fragment is then altered to conform to defined characteristics of the new cell. The defined characteristics of the new cell may include the size, shape, and aspect ratio of the new cell. Similarly, the appearance of the second fragment is altered to conform to predetermined characteristics of the first cell. The predetermined characteristics may include the size, shape, and aspect ratio of the first cell. In this way, the image is composed or reconstructed from the fragments of the image by effectively swapping the positions of two fragments and altering their respective appearances within the grid.

After the second fragment is altered, the fragments are in a new configuration. This new configuration of fragments may be displayed within the grid. A determination may be made regarding whether the new configuration of fragments correctly represents the image. If the new configuration of the fragments does not correctly represent the image, then another two fragments may be swapped and the above-described steps may be repeated. However, if the new configuration correctly represents the image, a timestamp may be uploaded to the server. Typically, the timestamp represents the time it took to accurately compose the image. Finally, a score, more generally called a completion ranking, may be downloaded from the server. The score generally depends on the elapsed time it took to accurately compose the image and a level of difficulty associated with the computerize puzzle (i.e., the image and the grid).

The present invention and its advantages, those described above and otherwise, will be appreciated from studying the following detailed description and drawings, and the appended claims.

BRIEF DESCRIPTION OF THE DRAWINGS

FIG. 7, consisting of FIGS. 7A–7B, is a flow diagram illustrating steps from the preferred method for composing an image from image fragments within a grid when a single image fragment is moved.

FIG. 8, consisting of FIGS. 8A–8B, is a flow diagram illustrating steps from the preferred method for composing an image from image fragments within a grid when the positions of two image fragments are swapped.

DETAILED DESCRIPTION OF THE PREFERRED EMBODIMENT

The present invention is directed to a system for composing an image from fragments of the image. The image is divided into the fragments according to a particular playing grid. An initial configuration of the fragments within the grid is displayed to the player after the fragments are shuffled. The player selects a fragment and moves it to a new position within the grid. As a result, the appearance of the moved fragment is adaptively altered (e.g., stretched or shrunk) to conform to the size, shape, and aspect ratio of the new position. This poses a stimulating visual challenge to the player because the grid positions are non-uniform in size, shape, and aspect ratio. Additionally, two fragments may be selected and swapped in their respective positions. Once their respective positions are swapped, the appearance of each of the two fragments is essentially stretched or shrunk to fit their new respective positions.

The preferred embodiment of the present invention is represented by a graphical puzzle, which is provided as part of the "MIND AEROBICS" content of the "MICROSOFT NETWORK" on-line data network developed by Microsoft Corporation of Redmond, Wash. Typically, a player connects to the "MICROSOFT NETWORK" on-line data network and then downloads control software for the puzzle from a server. Next, the player downloads the image fragments and the grid. The positions of the image fragments are shuffled within the grid. Then, the fragments are adaptively altered to visually conform to their respective positions within the grid. The shuffled and altered fragments are then initially displayed to the player. The player plays the puzzle by selecting and moving fragments to different positions within the puzzle grid. Upon moving a fragment, the control software alters the appearance of the moved fragment. The ability to alter the appearance of image fragments when the fragments are moved within the puzzle playing grid is the focus of the present invention.

The detailed description which follows is represented largely in terms of processes and symbolic representations of operations by conventional computer. The processes and operations performed by the computer include the manipulation of signals by a processor and the maintenance of these signals within data structures resident in one or more memory storage devices. These symbolic representations are the means used by those skilled in the art of computer programming and computer construction to most effectively convey teachings and discoveries to others skilled in the art. For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, modules, messages, fragments, data, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as creating, connecting, comparing, moving, displaying, determining, uploading, downloading, selecting, playing, and the like, which may be associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

The Exemplary Operating Environment

Figure 1:
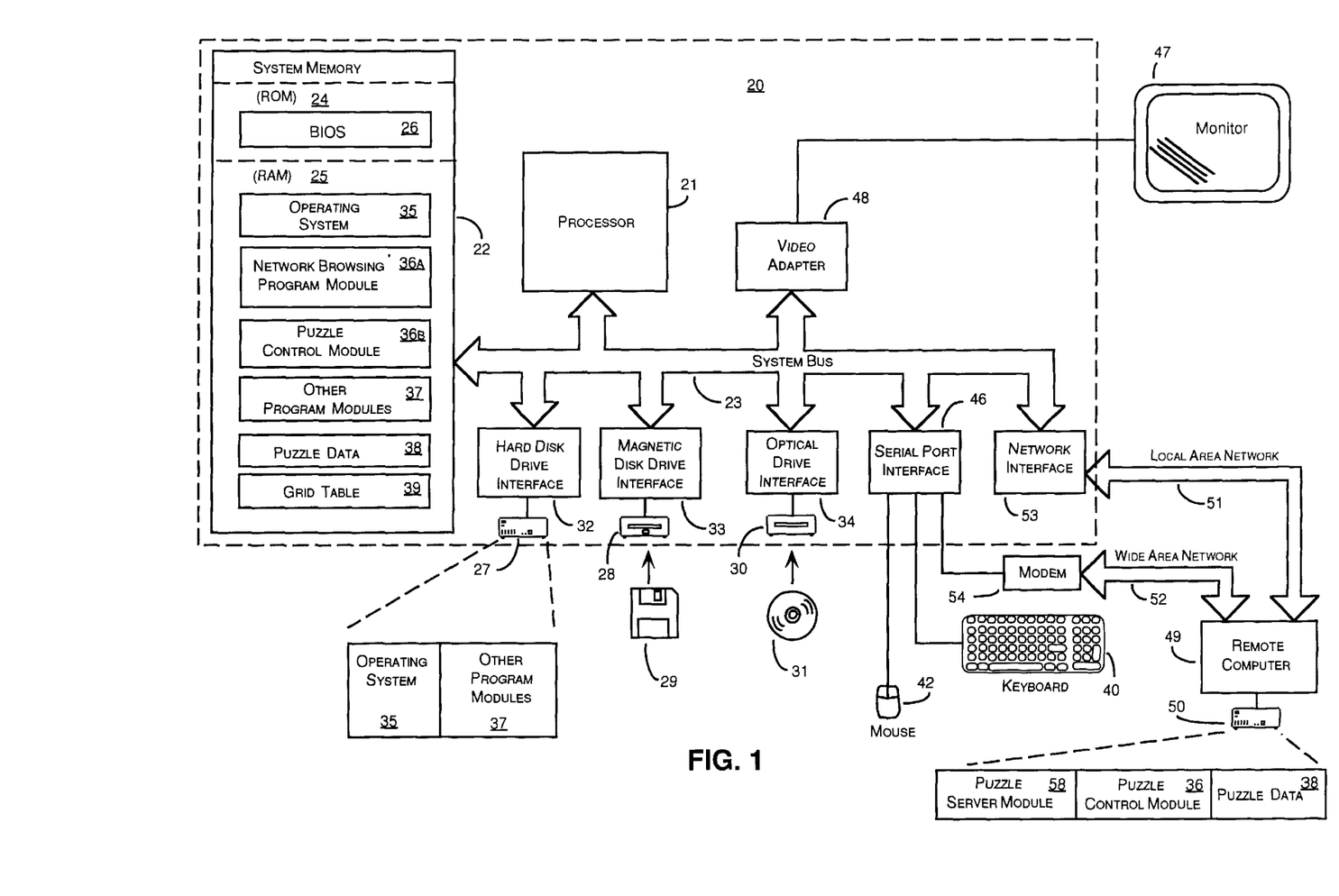
FIG. 1 is a block diagram of a personal computer that provides the operating environment for the preferred embodiment of the present invention.

FIG. 1 and the following discussion are intended to provide a brief, general description of the suitable computing environment in which the invention may be implemented. While the invention will be described in the general context of an application program that runs on an operating system in conjunction with a personal computer, those skilled in the art will recognize that the invention may also be implemented in combination with other program modules. Generally, program modules include code, applets, routines, programs, components, objects, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20 (also referred to as a client computer), including a processor 21, a system memory 22, and a system bus 23 that couples the system memory 22 to the processor 21. The system memory 22 includes read only memory (ROM) 24 and random access memory (RAM) 25. A basic input/output system 26 (BIOS) is stored in ROM 24. The BIOS 26 essentially contains the basic routines that help to transfer information between elements within the personal computer 20 during certain computer operations, such as during start-up. The personal computer 20 further includes a hard disk drive 27, a magnetic disk drive 28 (e.g., that reads from and writes to a removable disk 29), and an optical disk drive 30 (e.g., that reads from a CD-ROM disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above includes the hard disk drive 27, a removable magnetic disk 29 and an optical disk 31, such as a CD, it should be appreciated by those skilled in the art that other types of media which are readable by a computer, such as magnetic cassettes, flash memory cards, digital video disks and tapes, Bernoulli cartridges, and the like, may also be used in the exemplary operating environment.

A number of program modules may be stored in the drives and RAM 25, such as an operating system 35 and a network browsing program module 36a. In general, the network browsing program module 36a is a tool used to interact with other computers over data networks, such as the Internet and the World Wide Web. The network browsing program module 36a is also a tool capable of using downloadable program modules, such as the puzzle control module 36b, in order to direct operation of the personal computer 20. The drives and RAM 25 may also store other program modules 37, and program data (such as puzzle data 38 and a grid table 39).

The operating system 35, in conjunction with the BIOS 26 and associated device drivers, provides the basic interface between the computer's hardware and software resources, the user, and program modules such as the network browsing software module 36a. A user may enter commands and information into the personal computer 20 through a keyboard 40 and an input or pointing device, such as a mouse 42. Other input devices (not shown) may include a microphone, a joystick, a game pad, a satellite dish, a scanner, or the like. These and other input devices are often connected to the processor 21 through a serial port interface 46, such as a game port or a universal serial bus (USB). A monitor 47 or other type of display device is also connected to the system bus 23 via an interface, such as a video adapter 48. In addition to the monitor 47, personal computers typically include other peripheral output devices (not shown), such as printers and speakers.

The personal computer 20 may operate in a networked environment using logical connections to one or more remote programmable devices, such as a remote computer 49. The remote computer 49 may be a server, a router, a peer device, or other common network node. Typically, the remote computer 49 includes many or all of the elements described relative to the personal computer 20, although only a memory storage device 50 has been illustrated in FIG. 1. In an exemplary embodiment of the present invention, the remote computer's 49 memory storage device 50 contains data (such as the puzzle control module 36b and the puzzle data 37) which may be downloaded to the personal computer 20. The memory storage device 50 also contains program modules (such as the puzzle server module 58) which may be used by the remote computer 49 when communicating with the personal computer 20.

The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the remote memory storage device 50. It will be appreciated that the network connections show are exemplary and other means of establishing a communications link between the personal computer 20 and the remote computer 49 may be used.

As discussed earlier, the preferred embodiment of the present invention is embodied in the puzzle control module 36b. The puzzle control module 36b essentially controls the previously discussed computerized puzzle. In the exemplary operating environment, the puzzle control module is used in conjunction with the network browsing program module 36a, which is supported by Microsoft Corporation's "WINDOWS 95" or "WINDOWS NT" operating systems. However, it should be understood that the invention can be implemented for use with other network browsing program modules and with other operating systems, such as Microsoft Corporation's "WINDOWS 3.1" operating system, IBM Corporation's "OS/2" and "AIX" operating systems, SunSoft's "SOLARIS" operating system used in workstations manufactured by Sun Microsystem, Hewlett-Packard's "HP-UX" and "RT-UX" operating systems, and the operating system used in "MACINTOSH" computers manufactured by Apple Computer, Inc.

From this brief description, it should be appreciated that operating systems, such as the "WINDOWS 95" and "WINDOWS NT" operating system, are quite complex and provide a wide variety of services that allow users and programs to utilize the resources available in the personal computer. Those skilled in the art will be familiar with operating systems and their various features. For more comprehensive information regarding the "WINDOWS 95" and "WINDOWS NT" operating system and its interaction with programs, the reader may refer to any of a variety of publications, including the "Win32 Programmer's Reference" and "Advanced Windows", both published by Microsoft Press.

Figure 5:
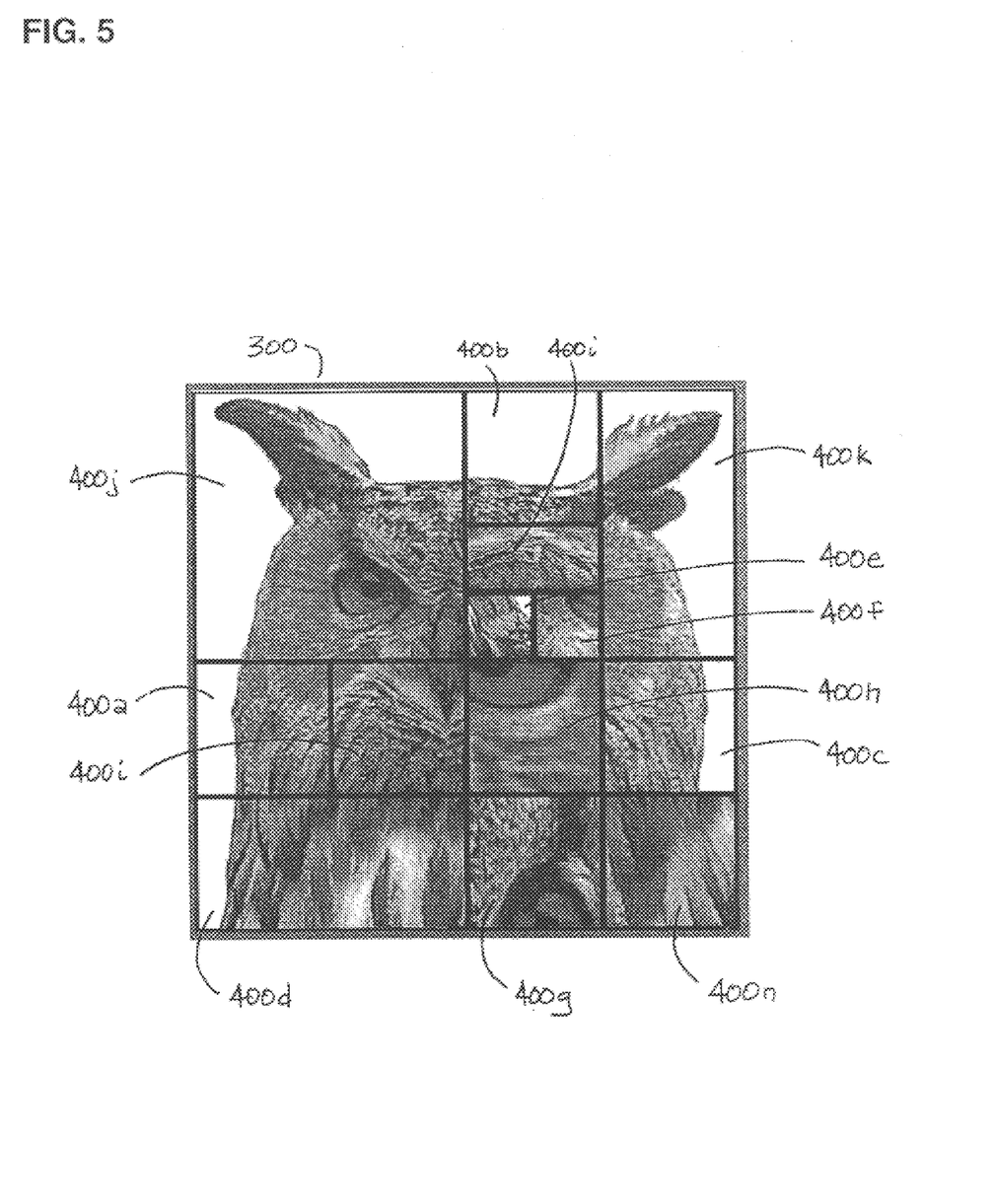
FIG. 5 is a diagram illustrating an intermediate configuration of the image fragments within the exemplary grid as the image is composed or reconstructed.
Figure 6:
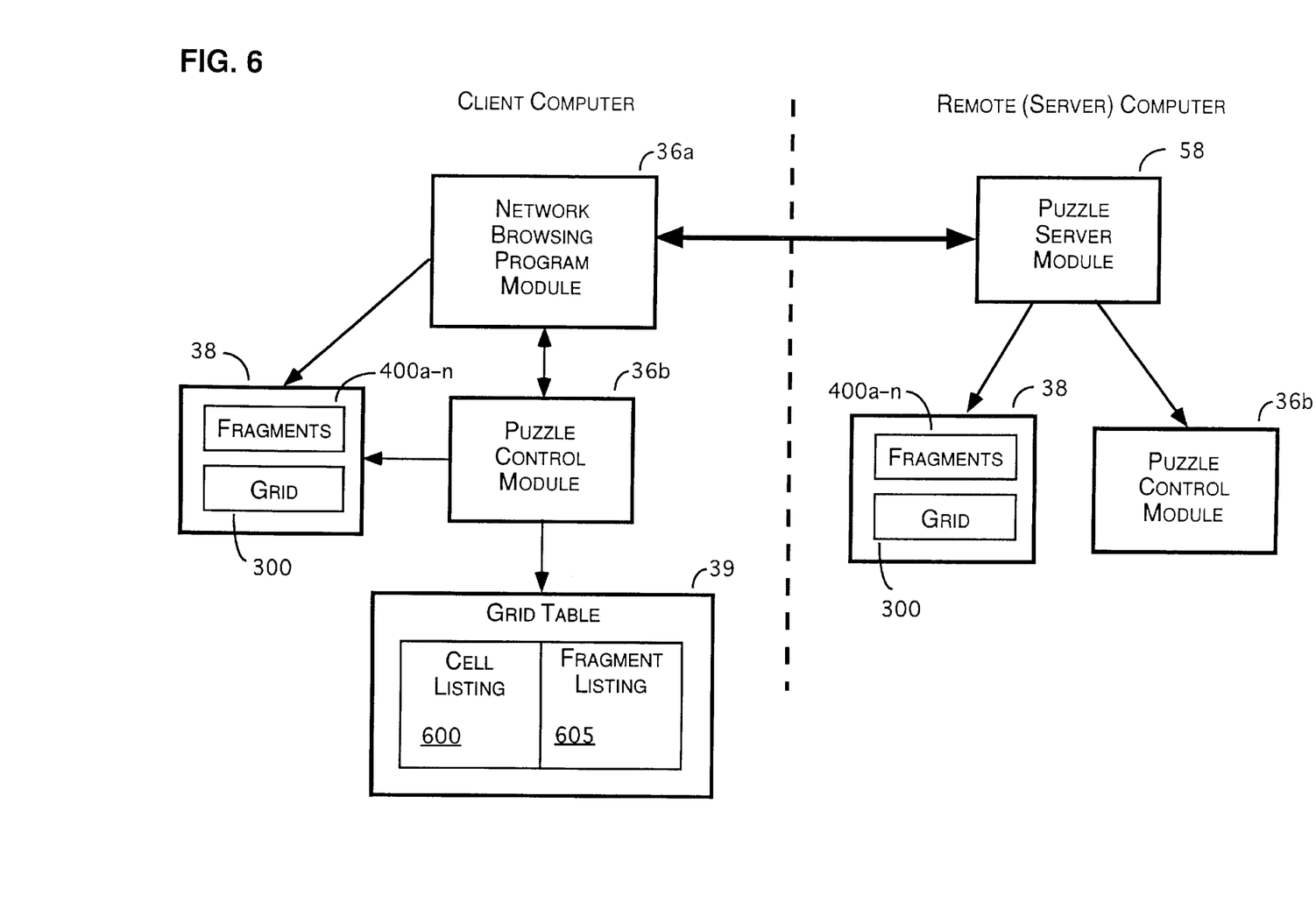
FIG. 6 is a diagram illustrating the relationships between a puzzle server module, a network browsing program module, a puzzle control module, puzzle data, and a grid table used by an embodiment of the present invention.

With the above preface on the exemplary operating environment for embodiments of the present invention, the remaining figures illustrate aspects of an embodiment of the present invention. In FIGS. 2–5, an exemplary puzzle is illustrated from a player's perspective. The exemplary puzzle uses an image, fragments of the image, and a playing grid used to define the fragments of the image. In FIG. 6, the program modules used when playing the exemplary puzzle are illustrated. FIGS. 7–8 are flow diagrams illustrating the preferred steps for composing an image when playing such an exemplary puzzle.

The Puzzle From a Player's Perspective

An exemplary embodiment of the present invention involves a computerized puzzle type of "compose the picture" puzzle. In general, the puzzle involves composing an image from fragments of the image which have been rearranged and visually deformed to conform to a grid. A player plays the puzzle by attempting to recreate the image. Essentially, the player changes the position of the fragments within the grid. The fragments may appear in a different size or aspect ratio when compared to their true and correct size and aspect ratio.

Upon changing a fragment's position, the appearance of the fragment is altered. In other words, the fragment is again visually altered (e.g., stretched or shrunk) to conform to its new position within the grid.

Figure 2:
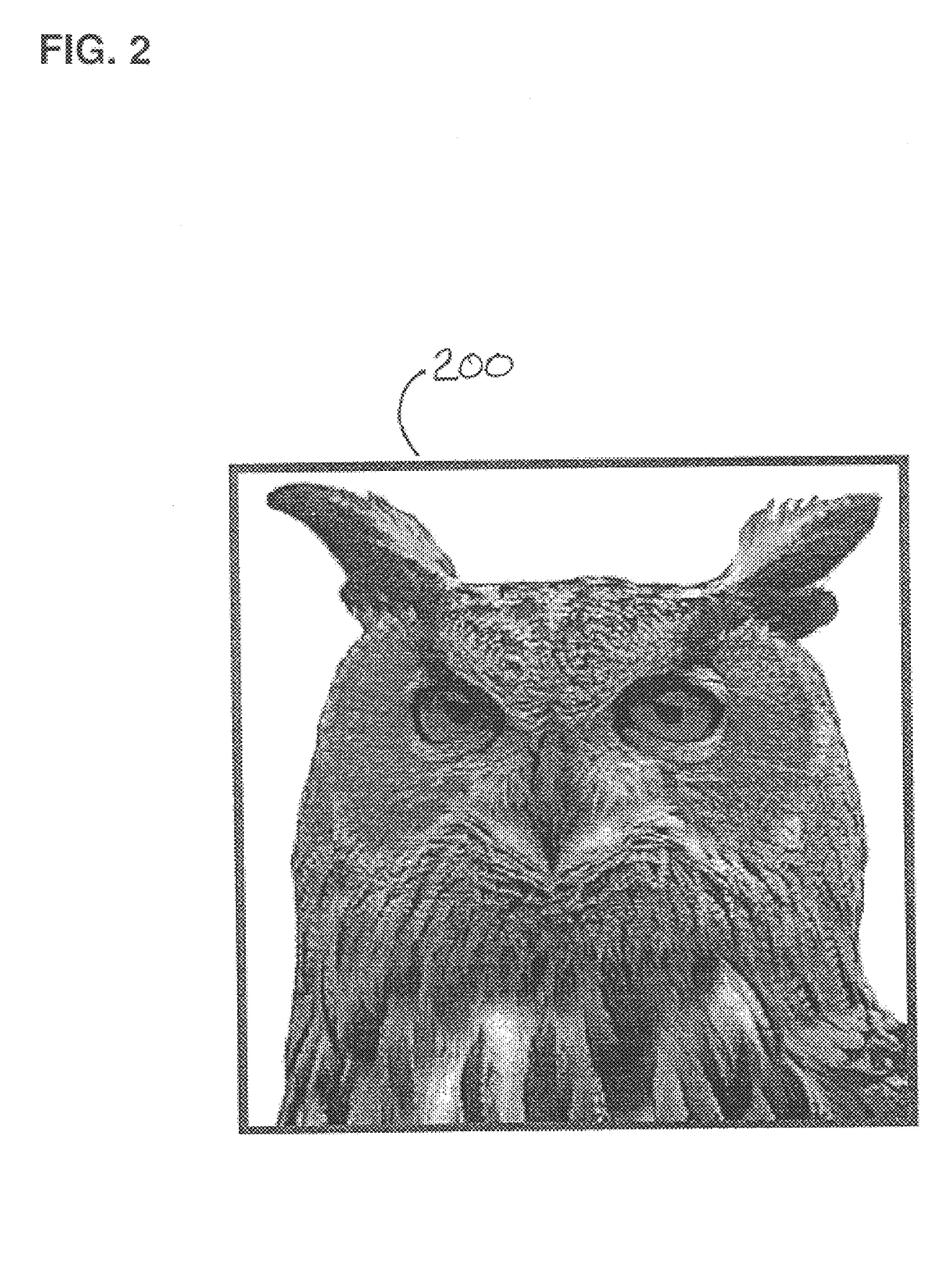
FIG. 2 is a diagram illustrating an exemplary image used by an embodiment of the present invention.

FIG. 2 is a diagram illustrating an exemplary image that may be used by the puzzle. Referring now to FIG. 2, the image 200 is used as a basis for the individual puzzle. In this example, the exemplary image 200 is a graphical representation of an owl. As will be discussed later in more detail, the image 200 is typically divided into distinct fragments of the image 200 according to a playing grid when the puzzle is initially created.

Figure 3:
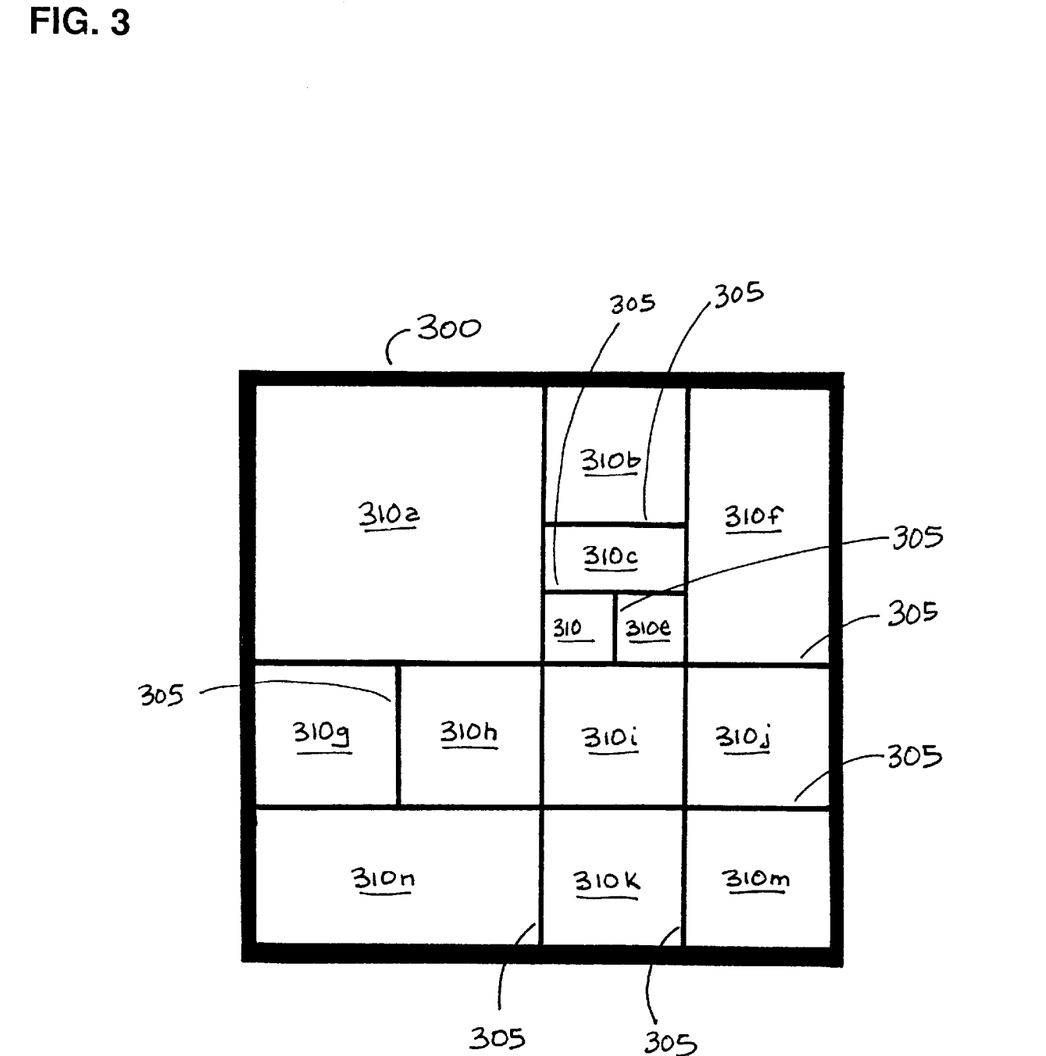
FIG. 3 is a diagram illustrating an exemplary grid used by an embodiment of the present invention.

FIG. 3 is a diagram illustrating an exemplary playing grid used by an embodiment of the present invention. Referring now to FIGS. 2 and 3, the grid 300 must completely cover the image 200 to be used with embodiments of the present invention. Essentially, the grid 300 contains grid lines 305 which define non-uniformly sized positions or cells 310a–n within the grid 300. The grid 300 may be of any size in an embodiment of the present invention. Large grids increase the level of difficulty of a given puzzle. However, the grid 300 is generally kept as a 6×6 grid or smaller to maintain an adequate level of difficulty while avoiding too many grid positions or cells 310a–n.

Traditional "compose the picture" puzzles may use a grid having uniformly shaped cells. Uniformly shaped cells were usually required in such traditional puzzles in order to easily swap the positions of different pieces of the picture. The grid 300 used with an embodiment of the present invention has cells 310a–n of a variety of non-uniform sizes and non-uniform aspect ratios. However, it is preferable to use cells 310a–n of a limited range of sizes and aspect ratios. The range of sizes and aspect ratios is preferably limited in order to avoid "pixelation" problems. A pixelation problem is when the appearance of a fragment within a cell is altered and distorted so much from its original appearance that a player begins to have trouble viewing the fragment. Accordingly, the range of sizes is preferably kept to an amount deemed appropriate, which will vary given the relative complexity of a given image 200.

Furthermore, the cells 310a–n may be of any shape in an embodiment of the present invention. However, the cells 310a–n are preferably square or rectangular in shape. This is because square or rectangular shaped cells provide a more normalized grid that allows players to focus on the graphics of the image 200, rather than the grid 300 itself.

By having cells of differing shape, size, and aspect ratio, the appearance of a fragment can be altered from its true and correct appearance to conform to the individual characteristics of the fragment's cell. It is contemplated that cells used with an embodiment of the present invention may also have a variety of shapes besides square shapes and rectangular shapes.

In the exemplary grid 300 illustrated in FIG. 3, the grid 300 is described as a 4×4 grid normally consisting of sixteen 1×1 squares. Some of these squares are 1×1 cells 310b, 310g–310m within the grid 300. Others of the squares are joined together to form different sized cells, such as a 2×2 cell 310a, a 2×1 cell 310n, and a 1×2 cell 310f. Additionally, some of the squares may even be cut into smaller cells, such as a 1×0.5 cell 310c and a 0.5×0.5 cell 310d. In summary, the exemplary grid 300 includes cells 310a–n of seven different sizes. The sizes include three sizes of square-shaped cells and two sizes of two different types of "two square" rectangular-shaped cells. This grid 300 is then typically applied to the image 200 to divide the image 200 into distinct fragments or pieces.

Figure 4:
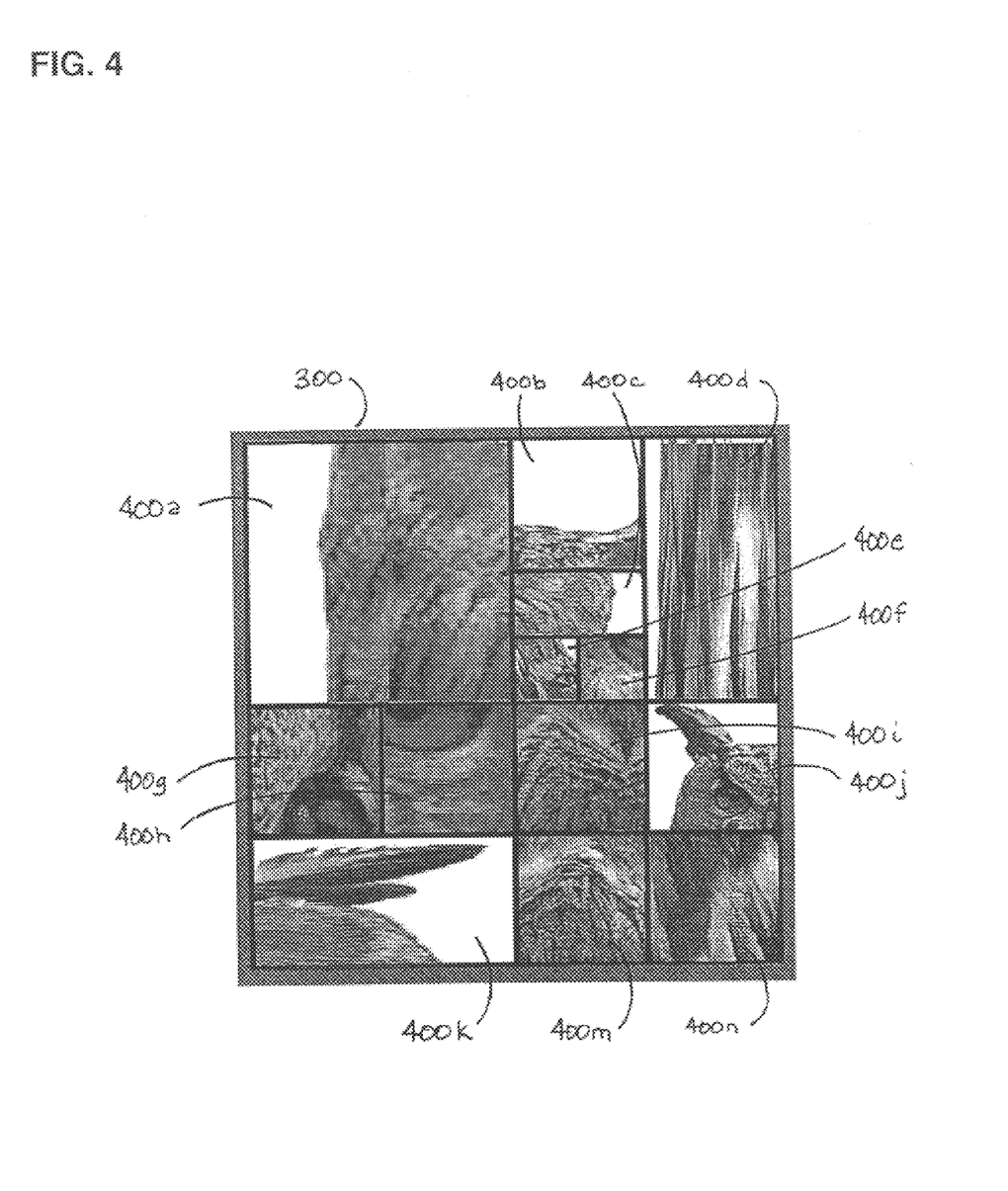
FIG. 4 is a diagram illustrating an initial configuration of image fragments within an exemplary grid where the appearance of the image fragments conform to their respective cells of the exemplary grid.

FIG. 4 is a diagram illustrating an initial configuration of image fragments within an exemplary grid. Referring now to FIGS. 2A, the appearance of fragments 400a–n of the image 200 conform to their respective cells 310a–n of the exemplary grid 300. As previously mentioned, the image 200 is divided into fragments 400a–n according to the cells 310a–n within the grid 300. However, the player does not see the image 200 at this point. The positions of the fragments 400a–n must be shuffled within the grid 300. After shuffling the fragments 400a–n into an initial configuration of the fragments 400a–n, the appearance of the fragments 400a–n is altered to conform to their new respective cells 310a–n. In other words, each fragment is stretched or shrunk independently in both the vertical and horizontal directions in order to fit into or conform to the characteristics of its new cell.

In the preferred embodiment, an image fragment is stretched and shrunk to conform to the characteristics of its cell using a standard graphics application programming interface function StretchBlt ( ). The StretchBlt ( ) function stretches or compresses a bitmap image to fit the dimensions of a destination rectangle. In this way, the StretchBlt ( ) function scales bitmap images, such as a fragment, based upon the dimensions of the destination rectangle, such as the new cell. One skilled in the art will be familiar with standard procedures for stretching or shrinking graphic images. Additional information regarding standard stretching and shrinking procedures, such as the StretchBlt ( ) function, may be found by referring to either the Win32 Programmer's Reference published by Microsoft Press or "Graphic Gems III", a computer graphics reference book edited by David Kirk and published by Academic Press.

The aspect of altering the appearance of a fragment in order to fit within part of the puzzle grid is one of the main focuses of the present invention. Typically, the appearance includes the size of the fragment and the aspect ratio of the fragment. However, the appearance may also include the shape of the fragment. By conforming the fragments 400a–n to the cells 310a–n in this manner, there are no overlapping fragments 400a–n. Additionally, the alteration of the appearance of the fragments 400a–n allows for a puzzle with fewer fragments 400a–n while still posing a challenging level of difficulty for players when compared to traditional "compose the picture" puzzles.

Once the player begins to move fragments 400a–n within the grid 300, the player may begin to recognize the image 200. FIG. 5 is a diagram illustrating an intermediate configuration of the fragments 400a–n within the exemplary grid 300 as the image 200 is reconstructed. Referring now to FIGS. 2–5, when the player moves one of the fragments 400a–n to a new cell or position within the grid 300, the appearance of the fragment is altered to conform to the new cell.

In one example, an ear and eye of the owl are shown in one of the image fragments 400j. The player moved this fragment 400j of the image 200 from one position 310j (in FIG. 4) to a different position 310a (in FIG. 5) within the grid 300 in the player's efforts to correctly reconstruct the image 200. In response to moving the fragment 400j, the appearance of the fragment 400j is altered to conform to the characteristics of its new location, the upper left corner cell 310a. This example illustrates how the size of the fragment can be altered in order to fit its new cell.

In another example, two fragments have swapped positions within the grid 300. A first fragment 400k is a representation of the owl's other ear and is initially located in a 2×1 cell 310n (in FIG. 4). This fragment 400k is swapped with a second fragment 400d representing feathers on the neck of the owl, which is initially located in a 1×2 cell 310f (in FIG. 4). As a result of swapping the fragments, the first fragment 400k is now located within the 1×2 cell 310f (in FIG. 5) and the second fragment 400d is now located within the 2×1 cell 310n (in FIG. 5). In response to moving these fragments, the respective appearance of the fragments are altered to conform to the characteristics of their respective new cells. This example illustrates how the aspect ratio of a fragment is altered in order to fit its new cell.

Essentially, the process of moving or swapping the position of fragments 400a–n within the grid 300 continues until the configuration of the fragments 400a–n correctly represent the image 200. When all of the fragments 400a–n correctly represent the image 200, the configuration of the fragments 400a–n looks like FIG. 2. Thus, from a player's perspective, the puzzle is played by composing the image using the fragments 400a–n and the grid 300.

Software Modules Used to Implement the Puzzle

Beyond the player's perspective, there are software modules which are used to implement the puzzle in an embodiment of the present invention. In this embodiment, the puzzle is an on-line game. FIG. 6 is a diagram illustrating the relationships between various software program modules from the embodiment of the present invention. Referring now to FIGS. 1–6, the network browsing program module 36a is used to make a connection between the personal computer 20 and a server, such as the remote computer 49. The connection is typically made via the WAN 52, although other logical connections between the personal computer 20 and the server will suffice. In this way, the network browsing program module 36a communicates with the server.

In this embodiment of the present invention, a puzzle control module 36b is downloaded from the server to the personal computer 20. Essentially, the puzzle control module 36b is a program module that controls how a player interacts with the computerized puzzle. In one embodiment, the puzzle control module 36b is a downloadable plug-in program module or applet used in conjunction with the network browsing program module 36a. In the preferred embodiment, the puzzle control module 36b is a program module written to support the standard "ActiveX" network programming language developed by the Microsoft Corporation. Those skilled in the art will be familiar with applets for enhancing the functionality of the network browsing program module 36a. However, one skilled in the art will realize that puzzle control module 36b is not limited to an applet implementation. In other embodiments of the present invention, the puzzle control module 36b could be a stand-alone program module instead of only a downloadable part of an on-line game.

Once the puzzle control module 36b is downloaded, the puzzle data 38 is downloaded from the server as well. The puzzle data 38 includes fragments 400a–n of an image 200 and a grid 300. An initial configuration of the fragments 400a–n is created by randomly shuffling the fragments 400a–n within positions or cells 310a–n of the grid 300. A grid table 39 is created in memory by the puzzle control module 36b to track and manage the relative assignments of the fragments 400a–n to the cells 310a–n within the grid 300. In one column 600 of the grid table 39 is a listing of cells 310a–n within the grid 300. In an adjacent column 605 of the grid table 39 is a corresponding listing of the fragments 400a–n. In the preferred embodiment, the puzzle control module 36b is capable of randomly shuffling or re-assigning positions of the fragments 400a–n to cells 310a–n by changing the order of the listings 600, 605 within the grid table 39.

The player interacts with the personal computer 20 to play the puzzle. Essentially, inputs via the mouse 42 or the keyboard 40 are interpreted by the puzzle control module 36b when the player plays the on-line puzzle. When the configuration of the fragments 400a–n correctly represents the image 200, a timestamp message is sent or uploaded to the puzzle server module 58 on the server. The timestamp message contains a timestamp of an elapsed time it took the player to accurately compose the image 200 from the fragments 400*a–n*.

In response to receiving the timestamp message, the puzzle server module 58 generates a score or completion ranking for the player. The score is typically based upon the timestamp and the difficulty level of the particular puzzle. The score is then downloaded from the server to the network browsing program module 36*a*.

Figure 7A:
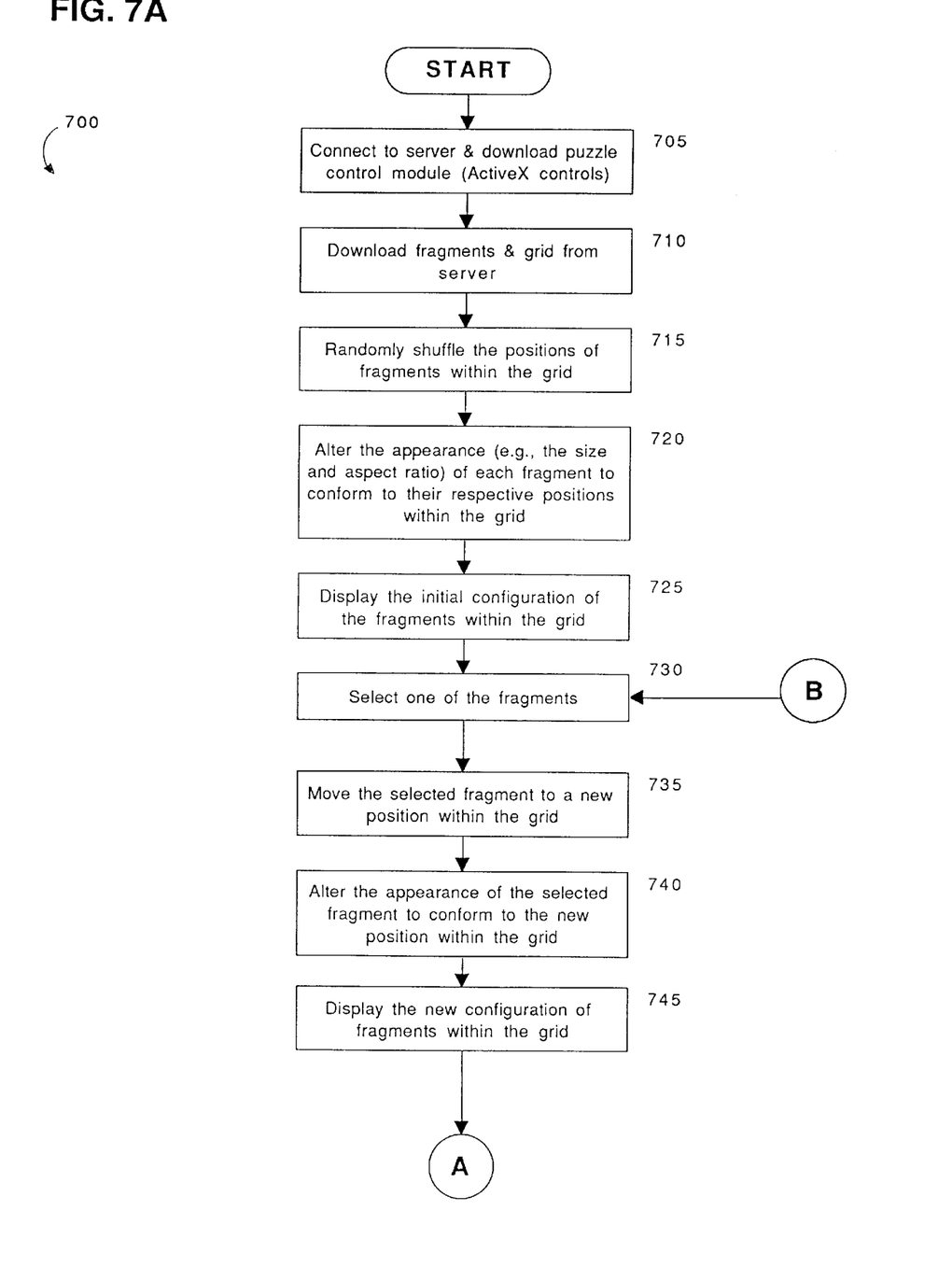
Figure 7B:
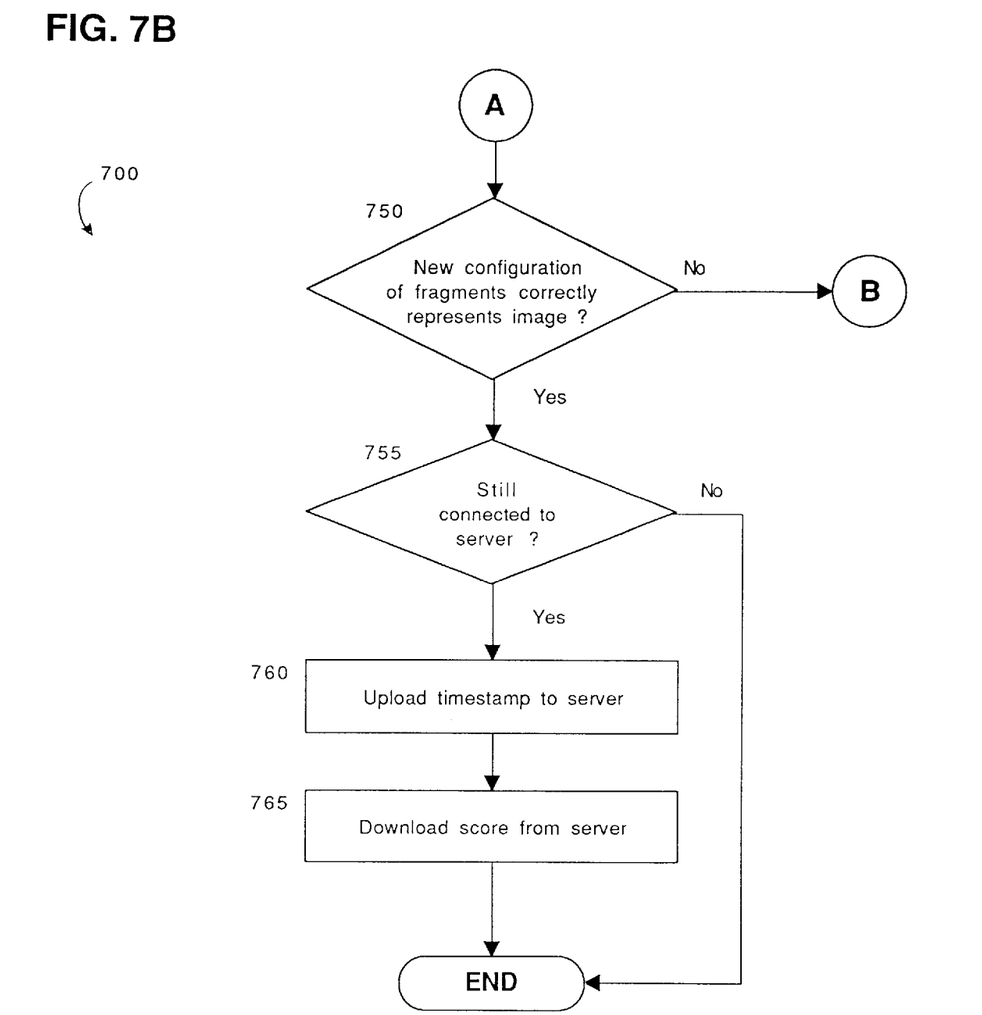
Figure 8A:
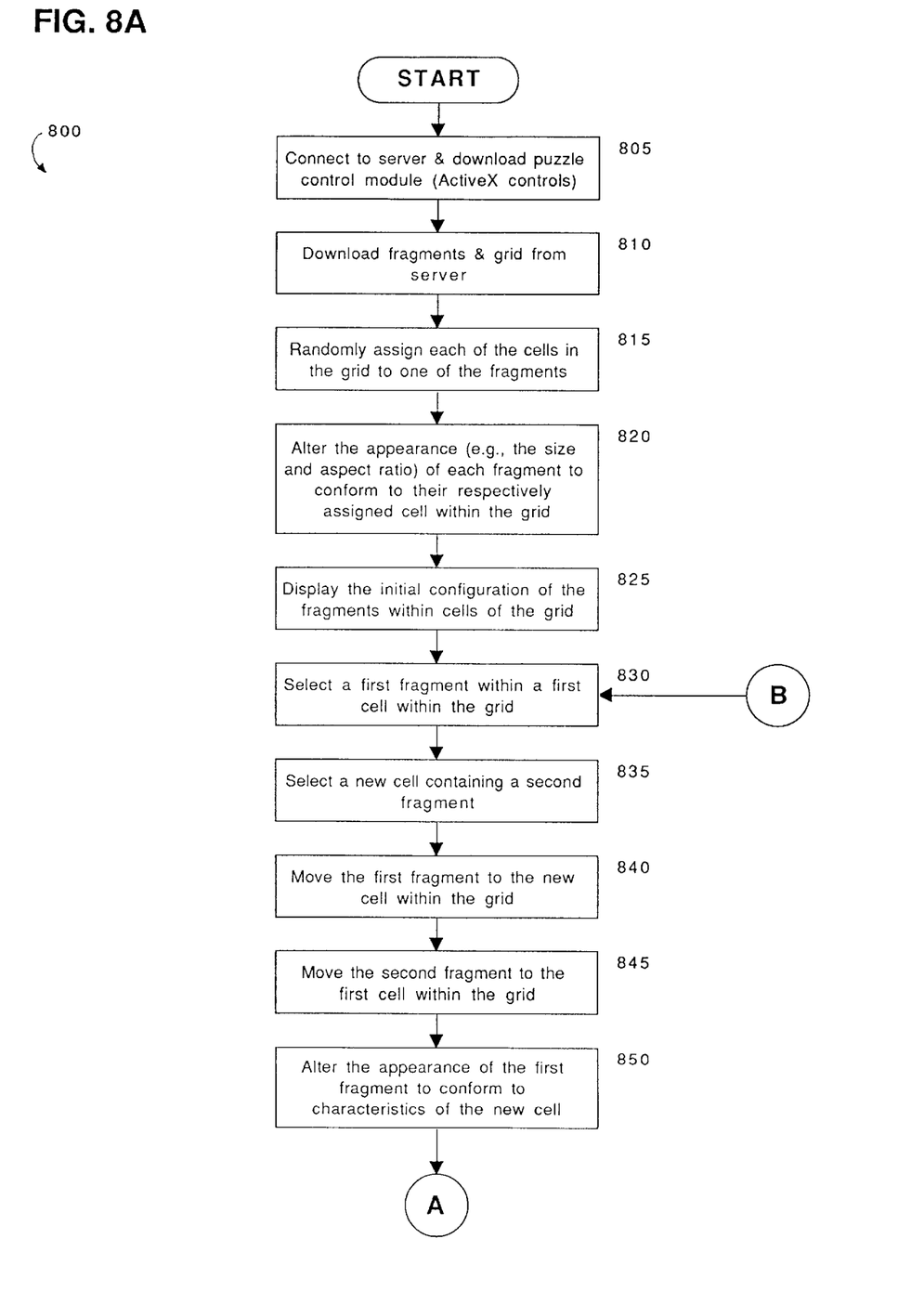
Figure 8B:
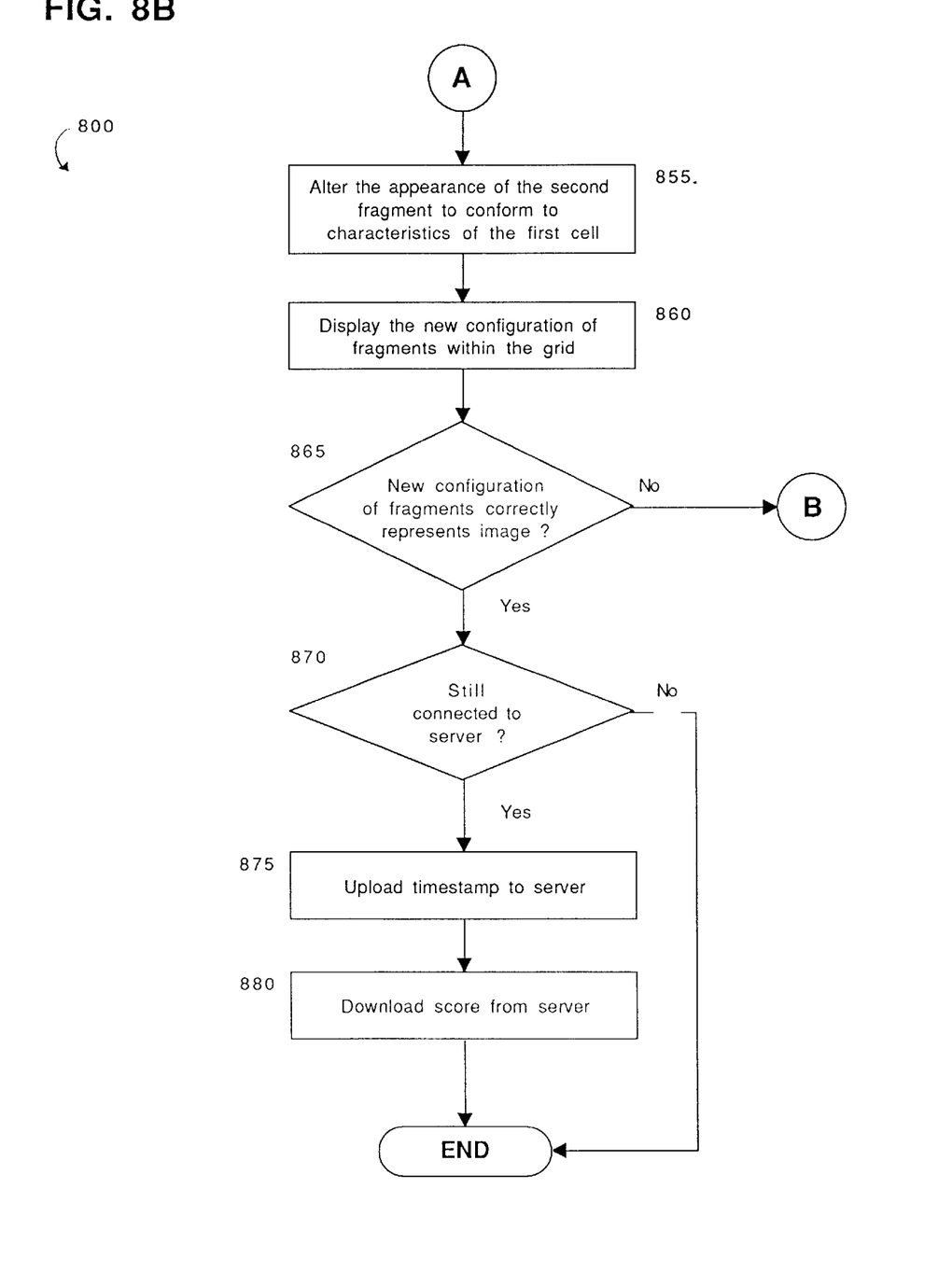

FIGS. 7 and 8 are flow diagrams supporting two embodiments of the present invention for composing an image. Essentially, FIGS. 7A and 7B, collectively described as FIG. 7, support an embodiment where a single fragment is moved within the grid 300 and the fragment's appearance is altered to conform to characteristics of the fragment's new position within the grid. FIGS. 8A and 8B, collectively described as FIG. 8, support an embodiment where two distinct fragments are swapped in position and then the fragments' appearances are altered to conform to their respective new positions.

Moving a Single Fragment

Referring now to FIGS. 1–7A, the preferred method 700 begins at step 705 where the personal computer 20 is connected to the server (e.g., the remote computer 49), preferably using the network browsing program module 36*a*. Once connected to the server, a puzzle control module is downloaded. As previously mentioned, the puzzle control module 36*b* is preferably an applet written to support the standard ActiveX network programming language.

At step 710, image fragments and a grid for the puzzle (such as the fragments 400*a–n* and the exemplary grid 300) are also downloaded. At this step, the fragments are not yet shuffled.

At step 715, the positions of the fragments 400*a–n* are shuffled, preferably randomly, within the grid 300. After shuffling the fragments' positions, the appearance of each fragment is altered to conform to the characteristics of their respective positions within the grid 300 at step 720. This yields an initial configuration of the fragments 400*a–n*.

At step 725, the initial configuration of the fragments 400*a–n* is displayed within the grid 300, similar to the configuration illustrated in FIG. 4. This is the first time the puzzle is displayed to a player who must try to compose the image by moving the fragments 400*a–n* within the grid 300.

At step 730, one of the fragments 400*a–n* is selected and then moved to a new position within the grid 300 at step 735. When moving the selected fragment, the puzzle control module 36*b* preferably updates the grid table reflecting the changed assignment of fragments to positions within the grid 300.

Selection of a fragment and the new position for the fragment may be accomplished by using the mouse 42 or the keyboard 40. The player may use the mouse 42 to position a cursor on the monitor 47 above the desired fragment before clicking on the fragment to select it. Similarly, the new position for the fragment may be selected using the same clicking process. It is contemplated that selection and moving of a fragment to its new position may also be accomplished by using a conventional drag-and-drop control process.

Alternatively, the player may also use arrow keys on the keyboard 40 to position the cursor above the desired fragment. Selection of the fragment is implemented by pressing the spacebar key on the keyboard 40. Similarly, the new position for the selected fragment is selected and the selected fragment is then moved.

At step 740, the appearance of the selected and moved fragment is altered to conform to the characteristics of its new position within the grid 300. This yields a new configuration of the fragments 400*a–n*. At step 745, this new configuration is displayed to the player before proceeding to step 750 of FIG. 7B.

Referring now to FIGS. 1–7A, and 7B, if the new configuration of the fragments 400*a–n* does not correctly represent the original image 200 at step 750, then step 750 proceeds back to step 730. In this manner, the player continues to play the puzzle and attempts to compose the image 200.

However, if the new configuration of the fragments 400*a–n* correctly represents the original image 200 at step 750, then the process proceeds to step 755. At this point, the player has solved the puzzle by composing the image from the fragments 400*a–n* within the grid 300.

At step 755, if the personal computer 20 is still connected to the server, step 755 proceeds to step 760. If the personal computer 20 became disconnected from the server, the player would still be able to play the puzzle by performing steps 730–750. However, if the personal computer 20 is no longer connected to the server, the preferred method 700 terminates after step 755.

At step 760, the connection to the server is still operational and a timestamp message is uploaded to the server, preferably via the network browsing program module 36*a*. The timestamp message essentially contains a timestamp representing the player's elapsed playing time when correctly composing the image 200 (i.e., solving the puzzle). The puzzle server module 58 on the server receives the timestamp message and generates a score, typically based on the timestamp and the level of difficulty for the puzzle. At step 765, the score is downloaded back to the personal computer 20.

In summary, one aspect of the present invention involves composing an image from image fragments within a grid when a single fragment is moved to a new position and the appearance of the moved fragment is altered to conform to characteristics of the new position.

Swapping Positions of Two Fragments

Another aspect of the present invention involves swapping the positions of two fragments within a grid. The appearance of each swapped fragment is altered to conform to its respective new position. As previously stated, FIGS. 8A and 8B support an embodiment of this other aspect of the present invention.

Referring now to FIGS. 1–6, 7A, and 8A, the preferred method 800 begins at step 805 where the personal computer 20 is connected to a server. Once connected to the server, a puzzle control module (preferably an applet written to support the standard ActiveX network programming language) is downloaded from the server.

At step 810, image fragments and a grid for the puzzle (such as the exemplary fragments 400*a–n* and the exemplary grid 300) are also downloaded. The grid 300 for the puzzle contains various non-uniformly sized cells 310*a–n* defined by grid lines 305 within the grid 300. The image fragments have not yet been assigned to specific cells within the grid.

At step 815, each of the cells 310*a–n* within the grid 300 are assigned, preferably in a random fashion, to one of the fragments 400*a–n*. In the preferred embodiment, the puzzle control module 36b randomly assigns fragments 400a–n to cells 310a–n using the adjacent listings within columns 600, 605 the grid table 39.

At step 820, the appearance of each fragment is altered to conform and fit the size and shape characteristics of the fragment's assigned cell. In this way, each fragment is essentially stretched or shrunk in both the vertical and horizontal directions so to conform to its assigned cell. The assignment and appearance altering for each fragment yields an initial configuration of the fragments 400a–n.

At step 825, the initial configuration of the fragments 400a–n is displayed within the grid 300, similar to the configuration illustrated in FIG. 4. In the preferred embodiment, this initial configuration is displayed within an area of the monitor 47 controlled by the network browsing program module 36a.

At step 830, a first fragment is selected. This first fragment is located within a first of the cells 310a–n within the grid 300. As previously mentioned, selection may be accomplished using either the keyboard 40 or the mouse 42.

At step 835, a new cell within the grid 300 is selected. The new cell is the desired position for the first fragment. However, the new cell currently contains a second fragment. In other words, the player desires to move the first fragment to the new cell having the second fragment already there. In this situation, the relative positions or assigned cells for the first fragment and the second fragment are simply swapped.

At step 840, the first fragment is moved to the new cell within the grid 300. In the preferred embodiment, the cell assignment for the first fragment within the grid table 39 is changed from the first cell to the new cell in order to move the first fragment.

At step 845, the second fragment is moved to the first cell preferably by changing the second fragment's cell assignment from the new cell to the first cell within the grid table 39. In this manner, the relative positions of the first fragment and the second fragment are swapped.

At step 850, the appearance of the first fragment is altered to conform to the characteristics of the new cell. Essentially, the characteristics of a cell include the cell's size, shape, and aspect ratio. After step 850, the preferred method 800 proceeds to step 855 on FIG. 8B.

Referring now to FIGS. 1–6, 8A, and 8B, the appearance of the second fragment is altered to conform to the characteristics of the first cell. Thus, steps 850 and 855 effectively change the configuration of the fragments 400a–n within the grid 300. This yields a new configuration of the fragments 400a–n within cells 310a–n of the grid 300. At step 860, this new configuration is displayed before proceeding to step 865.

At step 865, if the new configuration of the fragments 400a–n does not correctly represent the image 200, then step 865 proceeds directly back to step 830. In this situation, the new configuration of fragments 400a–n may appear as illustrated in FIG. 5 where the player has not yet successfully composed or reconstructed the image 200 from the fragments 400a–n.

However, if the new configuration of the fragments 400a–n correctly represents the original image 200 (as illustrated in FIG. 2), then step 865 proceeds to step 870. In this situation, the player has successfully composed the entire image 200 from the fragments 400a–n.

At step 870, if the personal computer 20 is still connected to the server, step 870 proceeds to step 875. Otherwise, the connection between the personal computer 20 and the server (i.e., the logical connection between the puzzle control module 36b and the puzzle server module 58 via the network browsing program module 36a) is no longer operational. For example, this may accidentally occur due to a problem with the WAN 52 or a problem with the remote computer 49. A loss of the connection may also purposefully occur in response to inputs from the player. The player may have decided to log off the server (i.e., the remote computer 49) while attempting to complete the puzzle. In this situation, the preferred method 800 terminates after step 870.

At step 875, a timestamp message is sent or uploaded to the server, preferably via the network browsing program module 36a communicating with the puzzle server module 58 over the WAN 52. As previously mentioned, the timestamp message contains information about the elapsed time it took the player to successfully compose the image 200 from the fragments 400a–n. In response to receiving the timestamp message, the puzzle server module 58 generates a score for the player based upon the information contained within the timestamp message. At step 880, the score is received or downloaded from the server.

In summary, another aspect of the present invention involves composing an image from fragments of the image within a grid when two of the fragments are swapped in position. The appearances of the swapped fragments are altered to conform to characteristics of their respective new positions. This provides a visually challenging, yet simplified and elegant way of playing a "compose the picture" type of puzzle.

Conclusion

From the foregoing description, it will be appreciated that the present invention provides a system and method for composing an image 200 from fragments 400a–n of the image 200 according to a playing grid 300. Initially, a puzzle control module 36b is downloaded from a server. The puzzle control module 36b operates in conjunction with a network browsing program module 36a. Next, the fragments 400a–n and the grid 300 are downloaded. The positions of the fragments 410a–n are shuffled within the grid 300. The appearance of each fragment is then altered to conform to characteristics of the fragment's position or cell 310a–n within the grid 300. After displaying an initial configuration of the fragments 400a–n, fragments are selected and moved to new positions or cells within the grid. In one embodiment, a single fragment is selected and moved to a new cell. In another embodiment, two fragments are swapped between their respective positions or cells. After moving or swapping any fragments, the appearance of a moved or swapped fragment is altered to conform to characteristics (such as the size, shape, and aspect ratio) of the fragment's new position or cell within the grid 300. This new configuration of the fragments 400a–n is displayed. If the new configuration represents the original image 200 and a connection to the server is still operational, a timestamp is uploaded to the server. In response to the uploaded timestamp, a score is generated and downloaded reflecting the player's score when composing the image 200 from the fragments 400a–n.

The foregoing system may be conveniently implemented in one or more program modules that are based upon the flow charts in FIGS. 7A, 7B, 8A, and 8B. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of an online game or puzzle where the puzzle contains fragments of an image which are moved within a playing grid of cells. However, those skilled in the art will understand that the principles of the present invention apply to any process that alters the appearance of image fragments when moved within a grid.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-readable medium on which is stored a computer program for composing an image which has been divided into a plurality of fragments according to a grid on a display, the grid having a plurality of positions of non-uniform size, the computer program comprising instructions, which when executed by a computer, perform the steps of:
   (a) displaying an initial configuration of the fragments within the grid on the display;
   (b) receiving input indicating the selection of one of the fragments as a selected fragment, the selected fragment located within one of the positions within the grid;
   (c) receiving input moving the selected fragment to a second of the positions within the grid, the second position having defined characteristics; and
   (d) altering an appearance of the selected fragment to conform to the defined characteristics of the second position.

2. The computer-readable medium of claim 1, wherein the altering step further comprises altering a size of the selected fragment and an aspect ratio of the selected fragment to conform to the defined characteristics of the second position.

3. The computer-readable medium of claim 1 further comprising, after step (d), the step of displaying a new configuration of the fragments within the grid on the display.

4. The computer-readable medium of claim 3 further comprising the step of determining if the new configuration of the fragments correctly represents the image.

5. The computer-readable medium of claim 4 further comprising the step of if the new configuration does not correctly represent the image, then repeating from step (b).

6. A method for composing an image, the image being divided into a plurality of fragments according to a grid defined by a plurality of cells of non-uniform size and non-uniform aspect ratio, the method comprising the steps of:
   (a) displaying an initial configuration of the fragments within the cells of the grid;
   (b) selecting a first of the fragments, the first fragment located within a first cell within the grid, and the first cell having predetermined characteristics;
   (c) selecting a new cell within the grid for the first fragment, the new cell previously containing a second fragment, and the new cell having defined characteristics;
   (d) moving the first fragment to the new cell within the grid;
   (e) moving the second fragment to the first cell within the grid;
   (f) altering an appearance of the first fragment to conform to the defined characteristics of the new cell; and
   (g) altering an appearance of the second fragment to conform to the predetermined characteristics of the first cell.

7. The method of claim 6, wherein step (f) further comprises altering a size of the first fragment and an aspect ratio of the first fragment to conform to the defined characteristics of the new cell; and
   wherein step (g) further comprises altering a size of the second fragment and an aspect ratio of the second fragment to conform to the predetermined characteristics of the first cell.

8. The method of claim 6 further comprising, after step (g), the step of displaying a new configuration of the fragments within the cells of the grid.

9. The method of claim 8 further comprising the step of determining if the new configuration of the fragments correctly represents the image.

10. The method of claim 9 further comprising the step of if the new configuration does not correctly represent the image, then repeating from step (b).

11. The method of claim 10 further comprising the step of if the new configuration correctly represents the image, then sending a timestamp to a server computer system, the timestamp representing an elapsed time it took to compose the image from the fragments.

12. The method of claim 11 further comprising the step of receiving a completion ranking from the server computer system, the completion ranking based upon the timestamp.

13. A computer system for composing an image within a computerized puzzle, the image divided into a plurality of fragments according to a grid having a plurality of positions of non-uniform size and aspect ratio, the computer system comprising:
   a processor;
   a memory coupled to the processor, the memory maintaining the fragments, the grid, and a control module; and
   a display device coupled to the processor for displaying a configuration of the fragments within the grid;
   an input device coupled to the processor;
   the input device being operative to:
      select a first of the fragments in a first of the positions within the grid, and
      select a second of the positions within the grid, the second position containing a second of the fragments; and
   the processor being operative to:
      execute instructions within the control module to control the computerized puzzle,
      move the first fragment to the second position in response to selecting the first fragment,
      move the second fragment to the first position in response to selecting the second position,
      alter an appearance of the first fragment to conform to defined characteristics of the second position; and
      alter an appearance of the second fragment to conform to predetermined characteristics of the first position.

14. The computer system of claim 13, wherein the processor is further operative to:

alter a size of the first fragment and an aspect ratio of the first fragment to conform to the defined characteristics of the second position; and alter a size of the second fragment and an aspect ratio of the second fragment to conform to the predetermined characteristics of the first position.

15. The computer system of claim 13 further comprising a communications interface coupled to the processor, the communications interface connecting a server to the computer system; and wherein the processor is further operative to download the control module, the fragments, and the grid from the server to the memory.

16. The computer system of claim 15, wherein the processor is further operative to determine if the configuration of the fragments correctly represents the image.

17. The method of claim 16, wherein the processor is further operative to, if the configuration correctly represents the image, send a timestamp from the computer system to the server via the communications interface, the timestamp representing an elapsed time it took to compose the image from the fragments.

18. The method of claim 17, wherein the processor is further operative to receive a completion ranking from the server via the communications interface, the completion ranking based upon the timestamp.

19. A computer-readable medium on which is stored a computer program for composing an image which has been divided into a plurality of fragments according to a grid on a display, the grid having a plurality of positions of non-uniform size, the computer program comprising instructions, which when executed by a computer, perform the steps of:

(a) shuffling the fragments between the positions within the grid in a random manner;

(b) altering an appearance of each of the fragments to conform to the defined characteristics of its respective position within the grid, thereby creating an initial configuration of the fragments within the grid;

(c) displaying the initial configuration of the fragments within the grid on the display;

(d) receiving an input signal indicating the selection of one of the fragments as a selected fragment, the selected fragment located within one of the positions within the grid;

(e) receiving an input signal moving the selected fragment to a second of the positions within the grid, the second position having defined characteristics; and (f) altering an appearance of the selected fragment to conform to the defined characteristics of the second position.

20. A method for composing an image, the image being divided into a plurality of fragments according to a grid defined by a plurality of cells of non-uniform size and non-uniform aspect ratio, the method comprising the steps of:

(a) connecting to a computer system and downloading a control module for moving the fragments and altering the appearance of each of the fragments;

(b) downloading the fragments and the grid from the computer system;

(c) individually assigning each of the cells within the grid to each of the fragments in a random manner;

(d) altering an appearance of each of the fragments to conform to its respectively assigned cell within the grid, thereby creating an initial configuration of the fragments within the cells of the grid;

(e) displaying the initial configuration of the fragments within the cells of the grid;

(f) selecting a first of the fragments, the first fragment located within a first cell within the grid, and the first cell having predetermined characteristics;

(g) selecting a new cell within the grid for the first fragment, the new cell previously containing a second fragment, and the new cell having defined characteristics;

(h) moving the first fragment to the new cell within the grid;

(i) moving the second fragment to the first cell within the grid;

(j) altering an appearance of the first fragment to conform to the defined characteristics of the new cell; and (k) altering an appearance of the second fragment to conform to the predetermined characteristics of the first cell.

* * * * *